L. C. Reese.
Harvester Rake.
No. 27832.   Patented April 10, 1860.
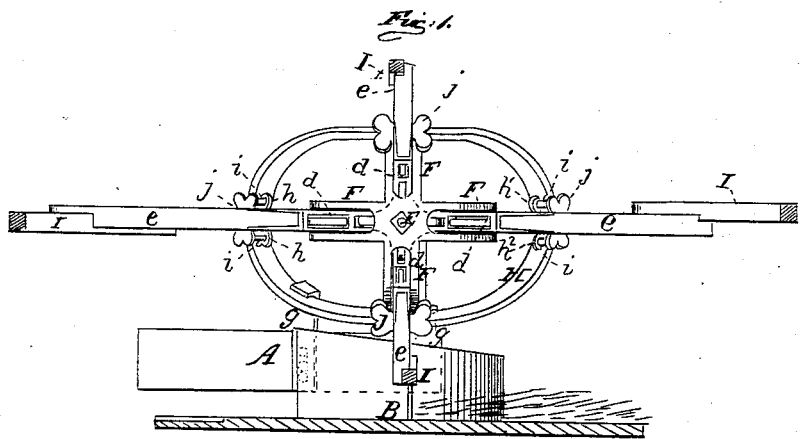
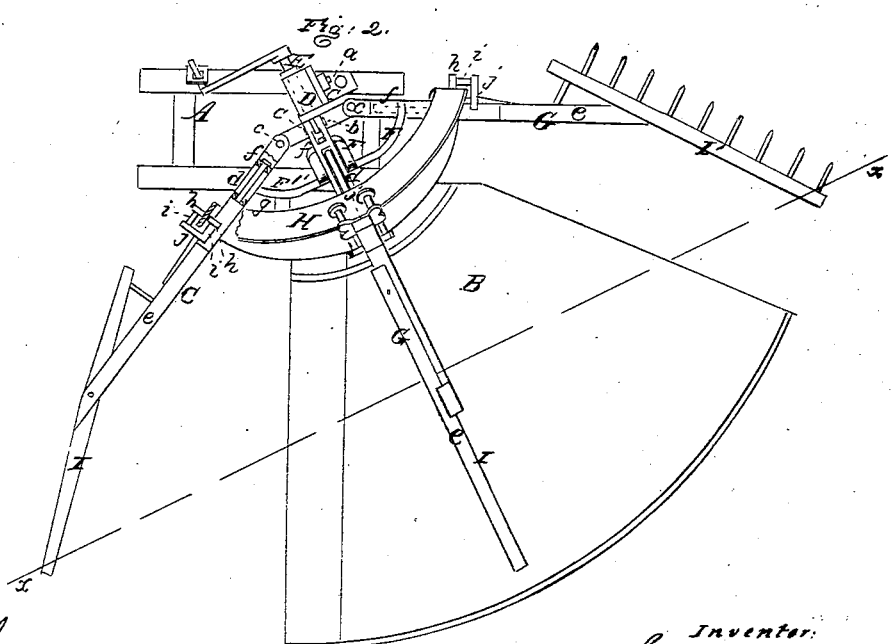
Witnesses:   Inventor:
J. W. Coombs   Lewis C. Reese
R. S. Spence   per Munn & Co.
   Attorneys

UNITED STATES PATENT OFFICE.

LEWIS C. REESE, OF PHILLIPSBURG, NEW JERSEY.

IMPROVEMENT IN HARVESTERS.

Specification forming part of Letters Patent No. 27,832, dated April 10, 1860.

*To all whom it may concern:*

Be it known that I, LEWIS C. REESE, of Phillipsburg, in the county of Warren, and State of New Jersey, have invented a new and useful Improvement in Grain and Grass Harvesters, the same being a combined rake and reel; and I do hereby declare that the following is a full, clear, and exact description of the same, reference being had to the annexed drawings, making a part of this specification, in which—

Figure 1 is a vertical section of my invention, taken in the line $xx$, Fig. 2; Fig. 2, a plan or top view of the same.

Similar letters of reference indicate corresponding parts in both figures.

This invention consists in the employment or use of a series of arms, constructed each with a swivel and connected to a rotary shaft by means of joints, the above parts being used in connection with a curved guide and retaining-arms, all the parts being so arranged as to cause the arms, as their shaft is rotated, to pass over the platform, and in such a relative position therewith and with the sickle as to perform the functions of a reel and raking device.

To enable those skilled in the art to fully understand and construct my invention, I will proceed to describe it.

A represents a portion of the main frame of a harvester, and B a platform attached thereto.

C is an upright attached to the main frame, said upright being slotted vertically and having a bearing, D, attached to it by a screw-bolt, $a$, which passes through the slot in the upright and through the bearing, and admits of a vertical adjustment of the latter.

E is a shaft, which is fitted in the bearing D, and allowed to rotate freely therein. To one end of this shaft E four radial arms, F, are attached, each arm being slotted longitudinally and curved slightly toward the opposite end of its shaft, E, as shown clearly in Fig. 2.

On the shaft E a hub or boss, $b$, is placed, and to this hub or boss four arms, G, are attached by joints $c$. Each arm G is also constructed with a swivel, $d$, to admit of a rotation of their outer parts, $e$, independently of their inner parts, $f$. The swivels $d$ are shown clearly in both figures, and constructed similarly to the ordinary swivels used for analogous purposes.

H represents a curved guide, which may be formed of a flat metal bar bent in elliptical form, and at the same time forming a transverse section of a flattened cone, or the bar may be described as being bent in an elliptical and flaring form. The shape of this guide is shown clearly in Figs. 1 and 2. The guide is attached to the main frame A by supports $g\,g$.

The arms G are connected to the guide H by friction-rollers $h$. These friction-rollers are, at the ends of rods $i$, attached to plates $j$, secured to the outer parts, $e$, of the arms G. There are four rods $i$ to each plate $j$, and two of the rods of each plate are at the outer and two at the inner side of the guide, and consequently each arm G has four friction-rollers that bear on the guide. To the end of each arm G an oblique bar, I, is attached, and the arms G are fitted in the slots of the arms F—one in each. The arms F retain the arms G in proper relative position with each other. To one of the bars I teeth are attached, forming a rake, $l'$.

The operation is as follows: The shaft E is rotated from any of the working parts of the device, and as said shaft rotates the arms G are carried around on the guide H, and descend just in front of the sickle at the front end of the platform, and traverse back over the platform, the rake $l'$ raking the cut grain therefrom, and the bars I performing, just before passing on the platform, the function of the beaters of a reel—viz., presenting the grain properly to the action of the cutters. The arms G and their rake-heads rise at the back end of the platform and pass in an elevated position toward the front part, when they descend, and again pass over the platform, the outer parts, $e$, of the arms G turning as they pass around on the guide H, owing to the swivels $d$ the bars turning down in a working position as they descend in front of the platform, and turning up as they pass upward at the back of the platform. The slotted arms F and joints $c$ admit of the arms G, as they rotate, working in and out under the influence of the guide H, and the arms F keep the arms G in a proper relative position with each other. The rake $l'$ and bars I may be made to work nearer to or farther from the platform B by adjusting the bearing D, and the several arms G are so arranged that they follow each other successively a trifle nearer the platform at every revolution of the shaft E, so that the bars I will not interfere with the cut grain on the platform. For instance, the first bar I succeeding the rake I' in practice is made to pass over the platform within eight inches of its surface, and the succeeding bar about nine and one-half inches, the next succeeding bar about eleven inches, and the rake then follows close to the platform and draws or rakes all the cut grain therefrom to the rear and off from the platform behind the main frame.

Having thus described my invention, what I claim as new, and desire to secure by Letters Patent, is—

1. The combination of the arms G, provided respectively with bars I and one or more rakes, I', with swivels, $d$, connected by joints $c$ to a rotating shaft, E, and by friction-rollers or other suitable means to a guide, H, to operate as set forth.

2. The employment or use, in connection with the guide H, of the slotted arms F, attached to the shaft E, and arranged, as described, to receive the arms G and retain the same in a proper relative position with each other, and arranged for adjustment substantially as described.

LEWIS C. REESE.

Witnesses:
ADAM R. REESE,
F. B. DAYTON.